United States Patent
Zhang et al.

(10) Patent No.: US 12,529,583 B2
(45) Date of Patent: Jan. 20, 2026

(54) PULSE SIGNAL OUTPUT CIRCUIT AND FLOWMETER

(71) Applicants: Goldcard Smart Group Co., Ltd., Zhejiang (CN); TANCY Instrument Group Co., Ltd., Zhejiang (CN)

(72) Inventors: Gengwei Zhang, Zhejiang (CN); Xianle Chen, Zhejiang (CN); Yuejian Fang, Zhejiang (CN)

(73) Assignees: Goldcard Smart Group Co., Ltd., Zhejiang (CN); TANCY Instrument Group Co., Ltd., Zhejiang (CN)

( * ) Notice: Subject to any disclaimer, the term of this patent is extended or adjusted under 35 U.S.C. 154(b) by 299 days.

(21) Appl. No.: 18/258,052

(22) PCT Filed: Nov. 25, 2021

(86) PCT No.: PCT/CN2021/133278
§ 371 (c)(1),
(2) Date: Jun. 16, 2023

(87) PCT Pub. No.: WO2022/135024
PCT Pub. Date: Jun. 30, 2022

(65) Prior Publication Data
US 2024/0102837 A1    Mar. 28, 2024

(30) Foreign Application Priority Data
Dec. 21, 2020   (CN) .......................... 202011523779.7

(51) Int. Cl.
*G01F 1/60*    (2006.01)
*G01F 1/74*    (2006.01)
(Continued)

(52) U.S. Cl.
CPC .................. *G01F 1/60* (2013.01); *G01F 1/74* (2013.01); *G01F 1/8436* (2013.01); *G01F 25/10* (2022.01);
(Continued)

(58) Field of Classification Search
CPC ........ G01F 1/60; G01F 25/10; G01F 25/0007; G01F 1/8436; G01F 25/0053; G01F 1/74;
(Continued)

(56) References Cited

U.S. PATENT DOCUMENTS 6,232,902 B1 * 5/2001 Wada .................... G01F 1/3287
341/143
9,228,869 B2 * 1/2016 Hunter ...................... G01J 1/44
(Continued)

FOREIGN PATENT DOCUMENTS

CN         2314417 Y  *  4/1999
CN       101334308 A  * 12/2008     ............. G01F 25/10
(Continued)

OTHER PUBLICATIONS

The Second Office Action of corresponding Chinese Application No. 202011523779.7, dated Jan. 16, 2025, 23 pages.
(Continued)

*Primary Examiner* — Stephanie E Bloss
*Assistant Examiner* — Kevin C Butler
(74) *Attorney, Agent, or Firm* — Tucker Ellis LLP (57) ABSTRACT

Provided are a pulse signal output circuit and a flowmeter. The pulse signal output circuit includes a signal-receiving module, a photoelectrical coupler, a signal conversion module; where the signal-receiving module is connected to the photoelectrical coupler, and the photoelectrical coupler is connected to the signal conversion module; the signal-receiving module is configured to receive a source pulse signal acquired by the flowmeter, and send the source pulse
(Continued)

signal to the photoelectrical coupler; the photoelectrical coupler is configured to perform electrical-optical-electrical conversion processing on the received source pulse signal to obtain an electrical signal, and send the electrical signal to the signal conversion module; the signal conversion module is configured to perform conversion processing on the received electrical signal to obtain and output an output pulse signal corresponding to the source pulse signal.

17 Claims, 8 Drawing Sheets

(51) Int. Cl.
    *G01F 1/84*           (2006.01)
    *G01F 25/10*         (2022.01)
    *H03K 3/037*        (2006.01)
    *H03K 3/42*          (2006.01)
    *H03K 19/0175*     (2006.01)

(52) U.S. Cl.
    CPC ............ *H03K 3/0375* (2013.01); *H03K 3/42* (2013.01); *H03K 19/017572* (2013.01)

(58) Field of Classification Search
    CPC ...... G01F 25/003; H03K 3/0375; H03K 3/42; H03K 19/017572
    USPC ......................................................... 73/1.34
    See application file for complete search history.

(56) References Cited

U.S. PATENT DOCUMENTS

| | | | |
|---|---|---|---|
| 9,285,256 B1 * | 3/2016 | Chang | G01F 1/60 |
| 11,075,585 B2 * | 7/2021 | Gao | H02M 3/01 |
| 2009/0000392 A1 * | 1/2009 | Zhou | G01F 25/10 |
| | | | 73/861.18 |
| 2020/0244176 A1 * | 7/2020 | Gao | H05B 47/10 |

FOREIGN PATENT DOCUMENTS

| | | | | |
|---|---|---|---|---|
| CN | 102024321 A | * | 4/2011 | |
| CN | 102175290 A | * | 9/2011 | |
| CN | 202194645 U | | 4/2012 | |
| CN | 204044242 U | * | 12/2014 | |
| CN | 104516388 A | * | 4/2015 | |
| CN | 204613934 U | * | 9/2015 | |
| CN | 204883455 U | * | 12/2015 | |
| CN | 204963882 U | * | 1/2016 | |
| CN | 106099892 A | * | 11/2016 | .......... H10D 89/911 |
| CN | 205679749 U | * | 11/2016 | |
| CN | 207439485 U | * | 6/2018 | |
| CN | 209383375 U | * | 9/2019 | |
| CN | 111478566 A | * | 7/2020 | .............. H02M 1/32 |
| CN | 210924242 U | | 7/2020 | |
| CN | 111983366 A | * | 11/2020 | .............. G01R 31/00 |
| CN | 112595392 A | * | 4/2021 | .............. G01F 25/10 |
| CN | 214251201 U | * | 9/2021 | |
| EP | 0989678 A2 | * | 3/2000 | .......... G01F 1/3287 |
| EP | 3050313 B1 | * | 10/2019 | .............. G01F 1/588 |
| JP | 2002340638 A | * | 11/2002 | .............. G01F 1/60 |
| JP | 4110442 B2 | * | 7/2008 | .............. G01F 1/60 |
| JP | 2011208954 A | * | 10/2011 | |
| WO | WO-2015047542 A1 | * | 4/2015 | .............. G01F 1/588 |
| WO | 2020151221 A1 | | 7/2020 | |

OTHER PUBLICATIONS

Binbin et al., "Design and Test Research of a Data Acquiring System Used in the Threshing and Separating Equipment for the Combine Experiment", Measurement and Control Technology, vol. 23, No. 6, 2004, 6 pages.

International Search Report of corresponding International Application No. PCT/CN2021/133278, dated Feb. 23, 2022, 15 pages.

Office Action of corresponding European Patent Application No. 21909023.0, dated Oct. 15, 2024, 9 pages.

First Office Action of corresponding Chinese Application No. 202011523779.7, dated May 29, 2024, 19 pages.

Office Action of corresponding Russian Application No. 2023119347/28, dated Feb. 13, 2024, 11 pages.

* cited by examiner

PULSE SIGNAL OUTPUT CIRCUIT AND FLOWMETER

CROSS-REFERENCE TO RELATED APPLICATION

The present disclosure is a National Stage of International Application No. PCT/CN2021/133278, filed on Nov. 25, 2021, which claims priority to Chinese Patent Application No. 202011523779.7, titled "PULSE SIGNAL OUTPUT CIRCUIT AND FLOWMETER", filed to China Patent Office on Dec. 21, 2020, both of above applications are hereby incorporated by reference in their entireties.

TECHNICAL FIELD

The present disclosure relates to circuit technologies and, in particular, to a pulse signal output circuit and a flowmeter.

BACKGROUND

In many application scenarios, it is necessary to provide a flowmeter, through which a measurement of a measured object is acquired. For example, there is a need to install a flowmeter in a natural gas pipeline, and for another example, there is also a need to install a flowmeter in a tap water pipeline, and the amount of usage of natural gas or tap water is acquired through these flowmeters.

As a special measuring instrument for energy measurement, especially a flowmeter for energy measurement used in industry and commerce, it needs to meet the accuracy requirements of the country. Therefore, it is necessary to regularly perform accuracy detection on the flowmeter. Typically, when detecting the measurement accuracy of the flowmeter, the flowmeter needs to output a pulse signal in the form of an electrical pulse, and then a determination is made based on the output pulse signal.

In the prior art, flowmeters provided with a pulse signal output circuit have poor electromagnetic compatibility protection, which often leads to a crash or reset phenomenon of the product during experimental tests related to electromagnetic compatibility.

SUMMARY

The present disclosure provides a pulse signal output circuit and a flowmeter to solve the technical problem of poor electromagnetic compatibility protection of the flowmeter in the prior art.

The first aspect of the present disclosure provides a pulse signal output circuit, including:
  a signal-receiving module, a photoelectrical coupler, and a signal conversion module;
  where the signal-receiving module is connected to the photoelectrical coupler, and the photoelectrical coupler is connected to the signal conversion module;
  the signal-receiving module is configured to receive a source pulse signal acquired by a flowmeter and send the source pulse signal to the photoelectrical coupler;
  the photoelectrical coupler is configured to perform electrical-optical-electrical conversion processing on the received source pulse signal to obtain an electrical signal, and send the electrical signal to the signal conversion module; and
  the signal conversion module is configured to perform conversion processing on the received electrical signal, to obtain and output an output pulse signal corresponding to the source pulse signal.

In an optional implementation, the pulse signal output circuit further includes a logical NOT module;
  the signal-receiving module is connected to the logical NOT module, and the logical NOT module is connected to the photoelectrical coupler; and
  the signal-receiving module sends the source pulse signal to the logical NOT module, and the logical NOT module processes the source pulse signal to obtain and send a first sub-signal to the photoelectrical coupler.

In an optional implementation, an external power acquiring module is further included;
  the external power acquiring module is connected between an external power supply and a control unit of a processor;
  when the external power supply supplies power, the external power acquiring module sends a first reference signal to the processor;
  when the external power supply does not supply power, the external power acquiring module sends a second reference signal to the processor;
  where the external power supply supplies power to the photoelectrical coupler and the signal conversion module.

In an optional implementation, the control unit is connected to the signal-receiving module;
  if the first reference signal is received by the processor, the processor sends a first control signal to the signal-receiving module; and
  when the first control signal is received by the signal-receiving module, the signal-receiving module receives the source pulse signal acquired by the flowmeter;
  if the second reference signal is received by the processor, the processor sends a second control signal to the signal-receiving module; and
  when the second control signal is received by the signal-receiving module, the signal-receiving module continuously outputs a preset level.

In an optional implementation, the signal-receiving module includes a signal-receiving chip;
  a first signal input pin of the signal-receiving chip is connected to an output terminal of an operating condition pulse of the flowmeter, and a second signal input pin of the signal-receiving chip is connected to an output terminal of a standard condition pulse of the flowmeter; and
  a setting pin of the signal-receiving chip is connected to the processor of the flowmeter for receiving a channel selection signal sent by the processor;
  when the channel selection signal is a first channel signal, the first signal input pin of the signal-receiving chip is turned on, and the first signal input pin is used to receive the operating condition pulse;
  when the channel selection signal is a second channel signal, the second signal input pin of the signal-receiving chip is turned on, and the second signal input pin is used to receive the standard condition pulse.

In an optional implementation, the logical NOT module includes: a first current-limiting sub-module, and a logical NOT circuit;
  the first current-limiting sub-module is connected between the signal-receiving module and the logical NOT circuit; the logical NOT circuit is connected between the first current-limiting sub-module and the photoelectrical coupler;

the first current-limiting sub-module receives the source pulse signal sent by the signal-receiving module, and performs current-limiting on the source pulse signal to obtain a current-limiting signal;

the first current-limiting sub-module sends the current-limiting signal to the logical NOT circuit; and the logical NOT circuit performs reverse processing on the current-limiting signal to obtain and send the first sub-signal to the photoelectrical coupler.

In an optional implementation, the first current-limiting sub-module includes: a first resistor, a second resistor, and a second capacitor;

the first resistor is connected between the signal-receiving module and the logical NOT circuit;

the second resistor is connected between an input pin of the logical NOT circuit and ground; and the second capacitor is connected between the input pin of the logical NOT circuit and the ground.

In an optional implementation manner, the logical NOT module further includes: a third resistor, a third capacitor, and a fourth capacitor;

the third resistor is provided between a power pin of the logical NOT circuit and a first power supply;

the third capacitor is provided between the first power supply and ground; and the fourth capacitor is provided between an output pin of the logical NOT circuit and the ground.

In an optional implementation, the circuit further includes: a first current-limiting resistor; where the photoelectrical coupler includes a light-emitting component and a light-receiving component;

the first current-limiting resistor is connected between a first end of the light emitting component and a first power supply;

the logical NOT module is connected to a second end of the light-emitting component; and a first end of the light-receiving component is connected to an external power supply, and a second end of the light-receiving component is connected to the signal conversion module.

In an optional implementation, the pulse signal output circuit further includes a fourth resistor and a fifth resistor;

a first end of the fourth resistor is connected to the external power supply, and a second end of the fourth resistor is connected to a first end of the fifth resistor, the second end of the light-receiving component, and the signal conversion module, respectively; and a second end of the fifth resistor is connected to ground.

In an optional implementation, the signal conversion module includes: a conversion output circuit;

the conversion output circuit is connected to the photoelectrical coupler; and the conversion output circuit receives the electrical signal sent by the photoelectrical coupler, and performs conversion processing on the electrical signal to obtain and output the output pulse signal corresponding to the source pulse signal.

In an optional implementation manner, the conversion output circuit includes: a P-type field-effect transistor and an N-type field-effect transistor;

the photoelectrical coupler is connected to a gate of the P-type field-effect transistor and a gate of the N-type field-effect transistor, respectively; and a drain of the P-type field-effect transistor is connected to a drain of the N-type field-effect transistor, and the output pulse signal is sent outward from a connection of the drains;

or, the conversion output circuit includes: a P-type triode, and an N-type triode;

the photoelectrical coupler is connected to a base of the P-type triode and a base of the N-type triode, respectively; and a collector of the P-type triode is connected to a collector of the N-type triode, and the output pulse signal is sent outward from a connection of the collectors.

In an optional implementation, the signal conversion module includes at least one of a fifth capacitor or a first capacitor;

the connection of the drain of the P-type field-effect transistor and the drain of the N-type field-effect transistor is grounded through the fifth capacitor;

or, the connection of the collector of the P-type triode and the collector of the N-type triode is grounded through the fifth capacitor;

the first capacitor is connected between a power pin and a ground pin of the signal-receiving chip.

In an optional implementation, the signal conversion module includes: a second current-limiting resistor and a sixth capacitor;

a source of the P-type field-effect transistor is connected to an external power supply through the second current-limiting resistor; and the sixth capacitor is connected between the external power supply and ground.

In an optional implementation, the signal conversion module further includes: a first bidirectional transient suppression diode and a stabilivolt tube;

the first bidirectional transient suppression diode is connected between the external power supply and the ground; and the stabilivolt tube is connected between the external power supply and the ground.

In an optional implementation manner, the signal conversion module further includes: a second bidirectional transient suppression diode; and the second bidirectional transient suppression diode is connected between the connection of the drain of the P-type field-effect transistor and the drain of the N-type field-effect transistor and the ground.

In an optional implementation, the external power acquiring module includes an external acquiring photoelectrical coupler and a second voltage-dividing sub-module;

the external power supply is connected to the second voltage-dividing sub-module, the second voltage-dividing sub-module is connected to the external acquiring photoelectrical coupler, and the external acquiring photoelectrical coupler is connected to the processor;

the external power supply sends a power signal to the second voltage-dividing sub-module;

the second voltage-dividing sub-module performs voltage-dividing processing on the power signal, to obtain and send a voltage-dividing signal to the external acquiring photoelectrical coupler; and the external acquiring photoelectrical coupler processes the received voltage-dividing signal to generate an optical signal, and then sends the first reference signal or the second reference signal to the processor according to the optical signal.

In an optional implementation, the external power acquiring module further includes a pull-up resistor;

an output terminal of the external acquiring photoelectrical coupler is connected to a first power supply through the pull-up resistor; and when the external power supply does not supply power, the external acquiring photoelectrical coupler sends a voltage signal corresponding to the first power supply to the processor.

In an optional implementation, the external power acquiring module further includes: a seventh capacitor and an eighth capacitor;

the seventh capacitor is connected between the pull-up resistor and ground; and the eighth capacitor is connected between the external acquiring photoelectrical coupler and the ground.

Another aspect of the present disclosure provides a flowmeter, including: the pulse signal output circuit as described in the first aspect.

The present disclosure provides a pulse signal output circuit and a flowmeter, including: a signal-receiving module, a photoelectrical coupler, and a signal conversion module; the signal-receiving module is connected to the photoelectrical coupler, and the photoelectrical coupler is connected to the signal conversion module; the signal-receiving module is configured to receive a source pulse signal acquired by a flowmeter and send the source pulse signal to the photoelectrical coupler; the photoelectrical coupler is configured to perform electrical-optical-electrical conversion processing on the received source pulse signal to obtain an electrical signal, and send the electrical signal to the signal conversion module; the signal conversion module is configured to perform conversion processing on the received electrical signal, to obtain and output an output pulse signal corresponding to the source pulse signal. The pulse signal output circuit and the flowmeter provided in the present application are provided with a photoelectrical coupler, and the pulse signal is transmitted through the photoelectrical coupler, which can isolate the internal processing system of the flowmeter from the external interface circuit, thereby improving the performance to resist external interference for the processing system of the flowmeter.

DESCRIPTION OF REFERENCE SIGNS flowmeter 11;
pipeline 12;
signal-receiving module 21;
photoelectrical coupler 22;
signal conversion module 23;
logical NOT module 31;
pulse signal 41;
first sub-signal 42;
pulse signal output circuit 50;
external power acquiring module 51;
external power supply 52;
processor 53;
signal receiving single-chip microcomputer 211;
first capacitor C1;
first current-limiting sub-module 311;
logical NOT circuit 312;
first resistor R5;
second resistor R6;
second capacitor C4;
third resistor R2;
third capacitor C3;
fourth capacitor C6;
first current-limiting resistor R3;
light-emitting component 81 included in photoelectrical coupler;
light-receiving component 82;
fourth resistor R4;
fifth resistor R7;
conversion output circuit 231;
P-type field-effect transistor Q1;
N-type field-effect transistor Q2;
fifth capacitor C5;
second current-limiting resistor R1;
sixth capacitor C2;
first bidirectional transient suppression diode D2;
stabilivolt tube D1;
second bidirectional transient suppression diode D3;
external acquiring photoelectrical coupler 511;
second voltage-dividing sub-module 512;
pull-up resistor R8;
seventh capacitor C7;
eighth capacitor C8.

DESCRIPTION OF EMBODIMENTS

When counting the flow, a flowmeter outputs a pulse signal according to the flow in an instantaneous operating condition, where one pulse corresponds to a fixed flow, and the flow flowing through the flowmeter can be counted according to the number of pulses. When verifying the accuracy of the flowmeter, the energy can be enabled to pass through the flowmeter, to obtain the pulse signal output by the flowmeter, and the statistical result of the flowmeter can be determined based on the pulse signal, then the amount of energy flowing through the flowmeter is compared with the statistical result, thereby determining the accuracy of the flowmeter.

Figure 1:
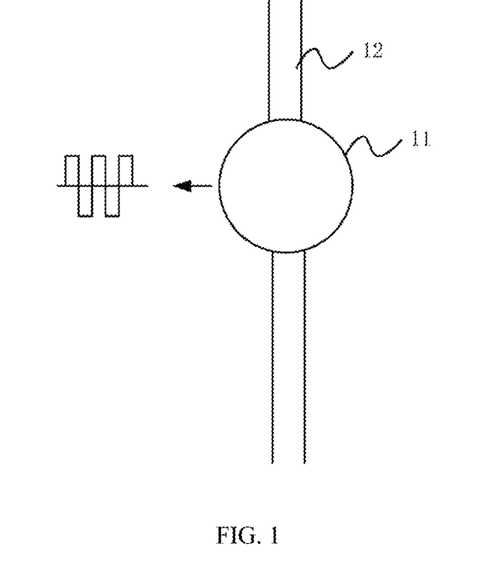
FIG. 1 is a diagram of an application scenario shown according to an illustrative embodiment of the present application.

FIG. 1 is a diagram of an application scenario shown according to an illustrative embodiment of the present application.

As shown in FIG. 1, a flowmeter 11 can be installed in a pipeline 12, through which energy can be transmitted, such as tap water or natural gas.

The flowmeter 11 can be connected to an external detection device, so that the external detection device receives a pulse signal output by the flowmeter 11, and a statistical result of the flowmeter 11 can be determined in this way. It is also possible to directly watch the display screen of the flowmeter 11 to determine the statistical result of the flowmeter 11.

The accuracy of the flowmeter 11 can be determined by comparing the statistical result of the flowmeter 11 to the actual amount of energy passing through the flowmeter 11.

Since the flowmeter 11 needs to output the pulse signal outwards, the flowmeter 11 needs to be provided with a pulse signal output circuit. However, in the prior art, the pulse signal output circuit has poor electromagnetic compatibility protection, which often leads to crashing or resetting of the flowmeter when carrying out electromagnetic compatibility related experimental tests such as a surge test, a fast transient pulse group test, and an electrostatic test.

In order to solve the technical problem mentioned above, a pulse signal output circuit provided in the present application includes a signal-receiving module, a photoelectrical coupler, and a signal conversion module; where the signal-receiving module is connected to the photoelectrical coupler, and the photoelectrical coupler is connected to the signal conversion module, the photoelectrical coupler can insulatively isolate the signal-receiving module from the signal conversion module, and the signal-receiving module is configured to receive a source pulse signal of the flowmeter, and thus the photoelectrical coupler can insulatively isolate the signal conversion module from a processing system of the flowmeter, and then the ability to resist external interference can be improved for the processing system of the flowmeter.

Figure 2:
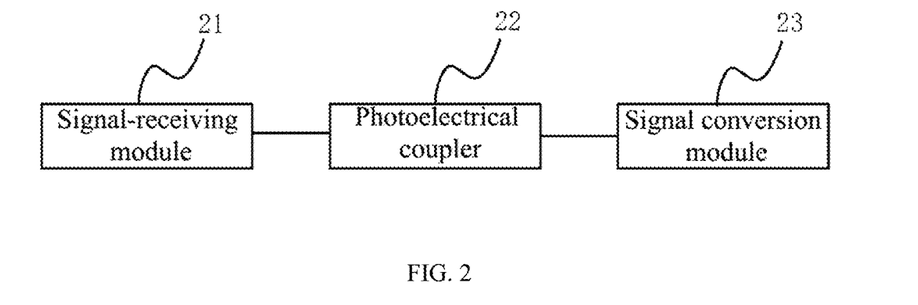
FIG. 2 is a schematic structural diagram of a pulse signal output circuit shown according to a first illustrative embodiment of the present application.

FIG. 2 is a schematic structural diagram of a pulse signal output circuit shown according to a first illustrative embodiment of the present application.

As shown in FIG. 2, the pulse signal output circuit provided in the present application includes: a signal-receiving module 21, a photoelectrical coupler 22, and a signal conversion module 23.

The signal-receiving module 21 can receive a source pulse signal acquired by a flowmeter.

In an implementation, the signal-receiving module 21 may be connected to a processor within the flowmeter. The flowmeter can be provided with a sensor therein to acquire the flow of energy. The sensor can send a sensor signal to the processor, and the processor can process the sensor signal to generate the source pulse signal. The processor may send the processed source pulse signal to the signal-receiving module 21.

In another implementation, the sensor of the flowmeter can acquire the flow of energy and generate sensor data that is sent to a single-chip microcomputer, the single-chip microcomputer for receiving performs correction processing on the sensor data and sends the source pulse signal to the signal-receiving module 21.

Specifically, the signal-receiving module 21 may also be connected to both the processor and the sensor mentioned above. A signal receiving channel of the signal-receiving module 21 may also be provided, which is enabled to receive the source pulse signal sent by the processor or the source pulse signal corrected by the single-chip microcomputer.

Further, the signal-receiving module 21 can send the received source pulse signal to the photoelectrical coupler 22.

The photoelectrical coupler is an electrical transmission device that transmits electrical signals in the medium of light. It consists of two parts: the light-emitting source and the light receptor. The pin of the light-emitting source is the input terminal, and the pin of the light receptor is the output terminal.

The photoelectrical coupler 22 can perform electrical-optical-electrical conversion processing on the received source pulse signal to obtain an electrical signal. The photoelectrical coupler 22 is connected to the signal conversion module 23 and can send the converted electrical signal to the signal conversion module 23.

The signal conversion module 23 can perform conversion processing on the received electrical signal, for example, convert the received electrical signal into a regularly-shaped square wave pulse signal. The signal conversion module 23 may have a signal output interface for outputting an output pulse signal, obtained through conversion, corresponding to the source pulse signal.

During practical application, in the circuit according to the present application, the electrical signal is transmitted by the photoelectrical coupler 22, so as to electrically isolate the signal-receiving module 21 from the signal conversion module 23. The signal-receiving module 21 is connected to the internal processing system of the flowmeter, and then the internal processing system of the flowmeter can be isolated from the external interface through the photoelectrical coupler 22, thereby improving the performance to resist external interference for the processing system of the flowmeter.

The pulse signal output circuit provided in the present application can be provided in the flowmeter, so that when the electromagnetic compatibility experiment is performed on the flowmeter, the internal processing system of the flowmeter will not crash or reset due to poor electromagnetic compatibility protection.

The pulse signal output circuit provided in the present application includes: the signal-receiving module, the photoelectrical coupler, and the signal conversion module; where the signal-receiving module is connected to the photoelectrical coupler, and the photoelectrical coupler is connected to the signal conversion module; the signal-receiving module is configured to receive the source pulse signal acquired by the flowmeter and send the source pulse signal to the photoelectrical coupler; the photoelectrical coupler is configured to perform electrical-optical-electrical conversion on the received source pulse signal and output same, and then send the electrical signal to the signal conversion module; the signal conversion module is configured to perform conversion processing on the received electrical signal, to obtain and output the output pulse signal corresponding to the source pulse signal. The pulse signal output circuit provided in the present application is provided with a photoelectrical coupler therein, and the pulse signal is transmitted through the photoelectrical coupler, which can isolate the internal processing system of the flowmeter from the external interface circuit, thereby improving the performance to resist external interference for the processing system of the flowmeter.

Figure 3:
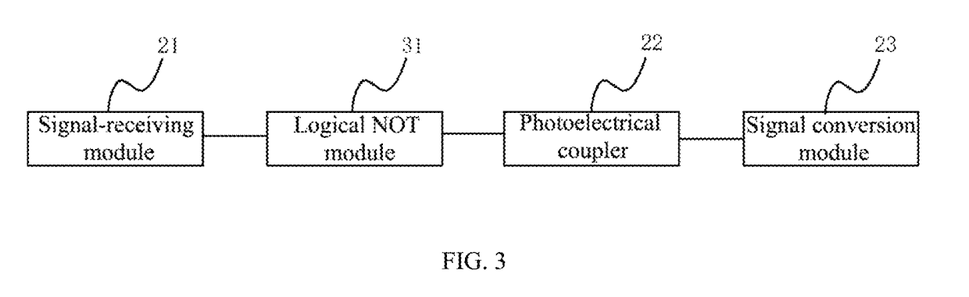
FIG. 3 is a schematic structural diagram of a pulse signal output circuit shown according to a second illustrative embodiment of the present application.

FIG. 3 is a schematic structural diagram of a pulse signal output circuit shown according to a second illustrative embodiment of the present application.

As shown in FIG. 3, the pulse signal output circuit provided in the present application further includes a logical NOT module 31.

The signal-receiving module 21 is connected to the logical NOT module 31, and the logical NOT module 31 is connected to the photoelectrical coupler 22, that is, the logical NOT module 31 can be provided between the signal-receiving module 21 and the photoelectrical coupler 22.

In this implementation, the signal-receiving module 21 can send the received source pulse signal to the logical NOT module 31, and the logical NOT module 31 can process the received source pulse signal to obtain a first sub-signal. Specifically, reverse processing can be performed on the source pulse signal, for example, the amplitude 0 of the source pulse signal is changed to 1, and the amplitude 1 of the pulse signal is changed to 0. For example, the logical NOT module 31 can be provided with a logical NOT gate circuit therein, through which reverse processing can be performed on the pulse signal.

Figure 4:
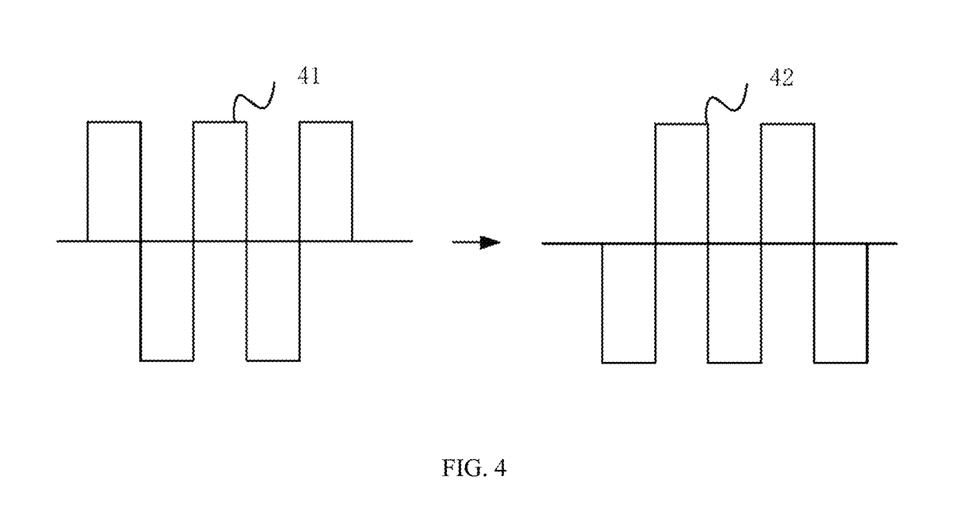
FIG. 4 is a schematic diagram of pulse signal processing by a logical NOT module shown according to an illustrative embodiment of the present application.

FIG. 4 is a schematic diagram of pulse signal processing by a logical NOT module shown according to an illustrative embodiment of the present application.

As shown in FIG. 4, after a pulse signal 41 is input to the logical NOT module, the first sub-signal illustrated as 42 is output, and the logical NOT module 31 can flip the pulse signal 41.

Optionally, the logical NOT module 31 can also send the first sub-signal obtained through processing to the photoelectrical coupler 22, to transmit the first sub-signal to the signal conversion module 23 through the photoelectrical coupler 22.

When the signal conversion module 23 is provided with a field-effect transistor conversion circuit or a triode conversion circuit, the polarities of the high and low levels of the source pulse signal received by the circuit can be consistent with those of the output pulse signal since the logical NOT module 31 is provided, for example, if, at time t, the source pulse signal is at a high level, then the output pulse signal is also at a high level at time k, which facilitates the design of circuit control logic.

Figure 5:
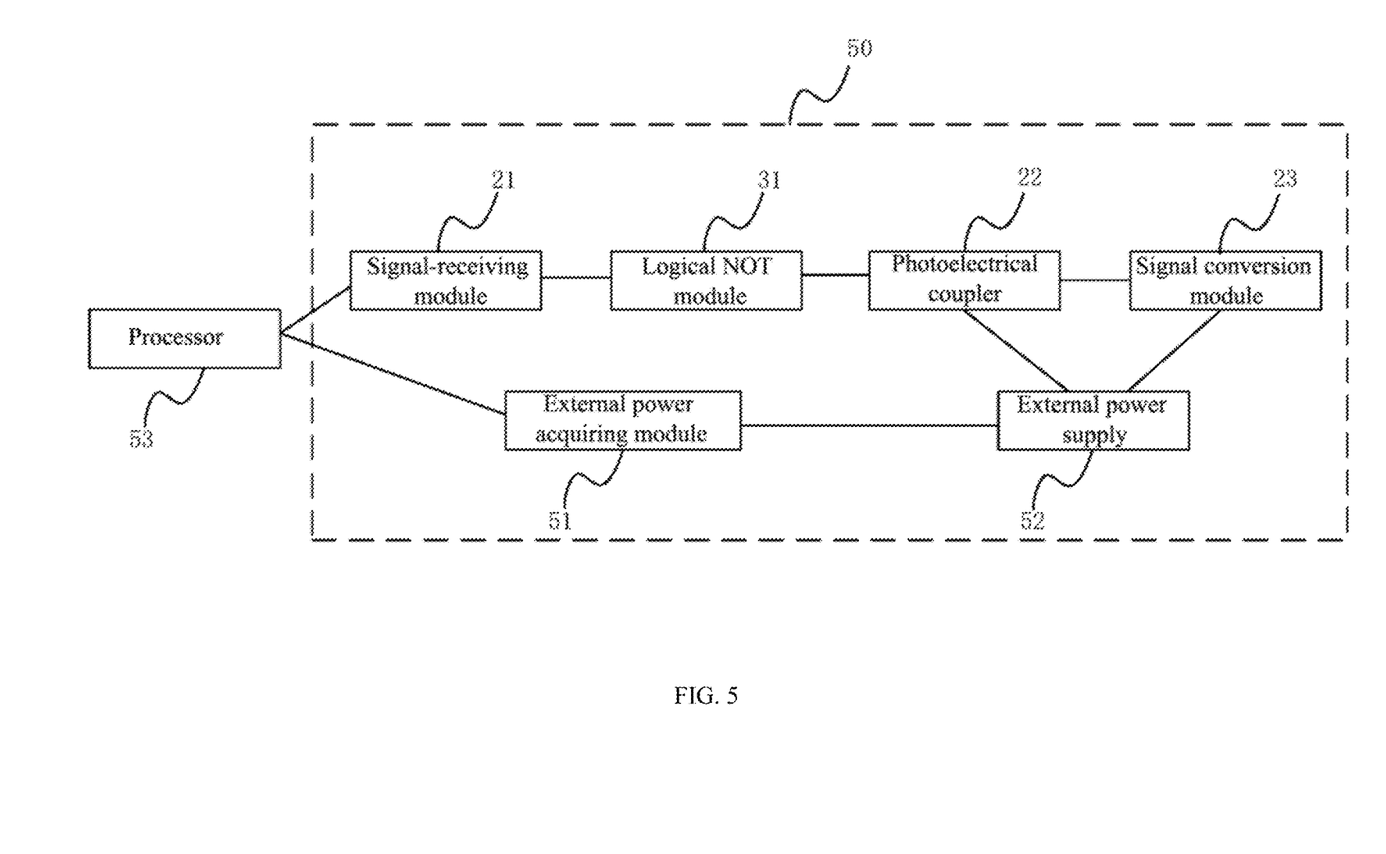
FIG. 5 is a schematic structural diagram of a pulse signal output circuit shown according to a third illustrative embodiment of the present application.

FIG. 5 is a schematic structural diagram of a pulse signal output circuit shown according to a third illustrative embodiment of the present application.

As shown in FIG. 5, a pulse signal output circuit 50 provided in the present application further includes an external power acquiring module 51. The external power acquiring module 51 is connected between an external power supply 52 and a processor 53 of the flowmeter.

The external power acquiring module 51 can send a power supply signal of the external power supply 52 to the processor 53. If the external power supply 52 supplies power outwards, the external power acquiring module 51 sends a first reference signal to the processor 53, so that the processor 53 determines that the external power supply can supply power normally; when the external power supply does not supply power, the external power acquiring module 51 sends a second reference signal to the processor 53, so that the processor 53 determines that the external power supply is not supplying power.

Specifically, the external power supply 52 can also be connected to the photoelectrical coupler 22 and the signal conversion module 23, so as to supply power to the photoelectrical coupler 22 and the signal conversion module 23.

Further, the processor 53 can also send a control signal to the signal-receiving module 21.

When the first reference signal is received by the processor 53, the processor 53 sends a first control signal to the signal-receiving module 21. That is, when the external power supply 52 supplies power normally, the processor 53 sends the first control signal to the signal-receiving module 21. When the first control signal is received by the signal-receiving module 21, the signal-receiving module 21 can receive the source pulse signal acquired by the flowmeter, and send the source pulse signal to the logical NOT module 31 or the photoelectrical coupler 22.

In practical application, when the second reference signal is received by the processor 53, the processor 53 sends a second control signal to the signal-receiving module 21. That is, when the external power supply 52 cannot supply power normally, the processor 53 sends the second control signal to the signal-receiving module 21. When the second control signal is received by the signal-receiving module 21, the signal-receiving module 21 continuously outputs a preset level.

If the logical NOT module 31 is provided, the preset level may be a high level, and after the high level enters the logical NOT module 31, a continuous low level is output, so that an input side of the photoelectrical coupler 22 cannot work, thereby the power consumption of the entire transmission circuit is reduced.

If the logical NOT module 31 is not provided, the preset level may be a low level, and the signal-receiving module 21 can continuously send a low-level signal to the photoelectrical coupler 22, so that the input side of the photoelectrical coupler 22 cannot work, thereby reducing the power consumption of the entire transmission circuit.

Figure 6:
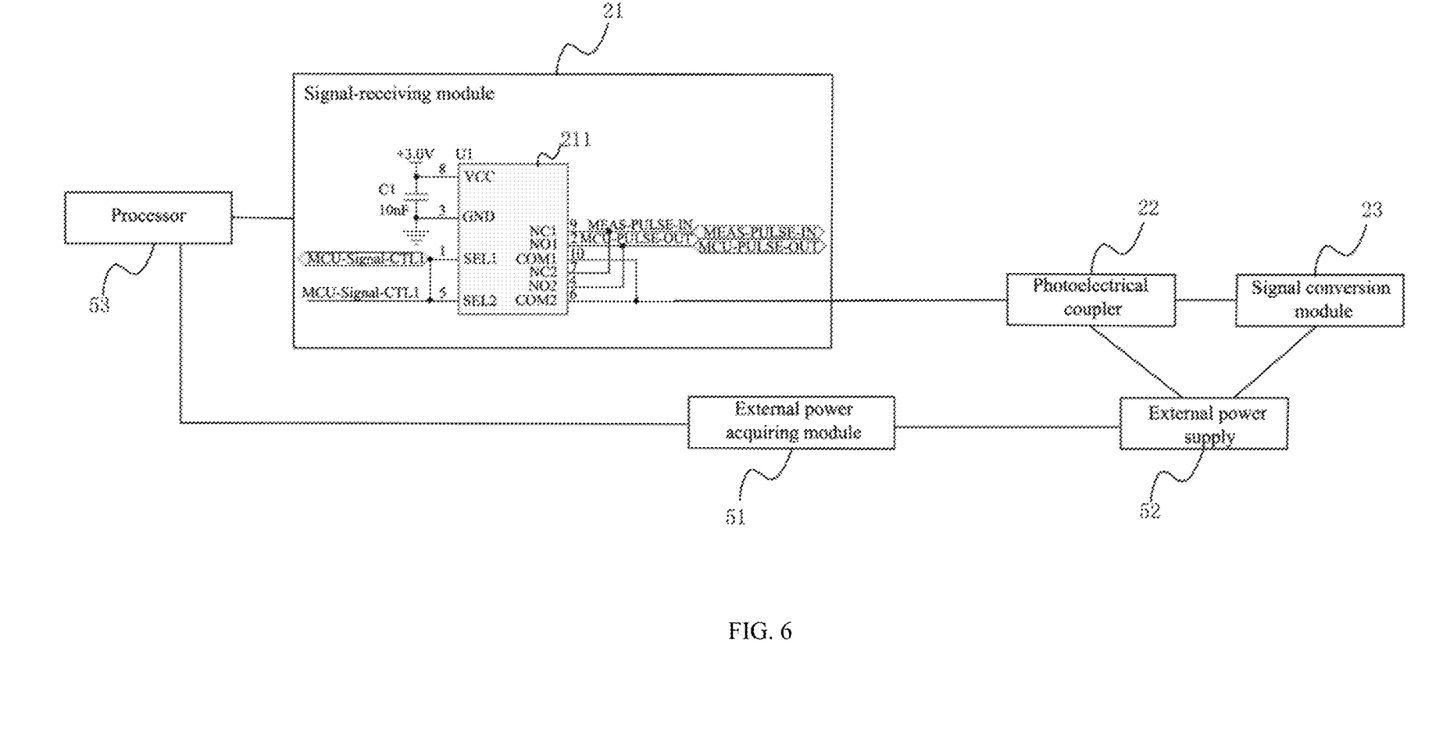
FIG. 6 is a schematic structural diagram of a pulse signal output circuit shown according to a fourth illustrative embodiment of the present application.

FIG. 6 is a schematic structural diagram of a pulse signal output circuit shown according to a fourth illustrative embodiment of the present application.

As shown in FIG. 6, in the pulse signal output circuit according to the present application, the signal-receiving module 21 includes a signal-receiving chip 211 (U1).

The signal-receiving chip 211 has a plurality of pins. The signal-receiving chip 211 may have a signal input pin, where a first signal input pin is connected to an output terminal of an operating condition pulse of the flowmeter, and a second signal input pin of the signal-receiving chip 211 is connected to an output terminal of a standard condition pulse of the flowmeter.

For example, the first signal input pin (pin 7 and pin 9) can be connected to the sensor of the flowmeter to receive the operating condition pulse (MEAS-PULSE-IN) sent by the sensor. For another example, the second signal input pin (pin 2 and pin 4) can be connected to a pin of the processor 53 of the flowmeter to receive the standard condition pulse (MCU-PULSE-OUT) sent by the processor 53.

Specifically, the signal-receiving chip 211 can also have a setting pin (pin 1 and pin 5), which can be connected to a pin of the processor 53 to receive a channel selection signal (MCU-Signal-CTL1) sent by the processor 53.

Further, when the channel selection signal received by the signal-receiving chip 211 is a first channel signal, the signal-receiving chip 211 controls the first signal input pin to be turned on, where the first signal input pin is used to receive the operating condition pulse. In this implementation, the pulse signal output circuit can output the operating condition pulse of the flowmeter.

When the channel selection signal received by the signal-receiving chip 211 is a second channel signal, the signal-receiving chip 211 controls the second signal input pin to be turned on, where the second signal input pin is used to receive the standard condition pulse. In this implementation, the pulse signal output circuit can output the standard condition pulse of the flowmeter.

When counting the flow, the flowmeter can directly obtain the operating condition pulse according to the energy flowing through it, and the processor of the flowmeter can process the operating condition pulse to obtain the standard condition pulse.

In an optional implementation, if the logical NOT module 31 is provided, the signal-receiving chip 211 is connected between the processor 53 of the flowmeter and the logical NOT module 31.

In the circuit according to the present application, the operating condition pulse or the standard condition pulse can be selectively output according to the requirements.

Please continue to refer to FIG. 6, in an optional implementation, the signal-receiving module includes: a first capacitor C1.

The first capacitor C1 is connected between a power pin (pin 8) and a ground pin (pin 3) of the signal-receiving chip 211. The power pin can be connected to a +3V power supply, and the ground pin can be grounded.

The first capacitor C1 may be a chip capacitor, specifically a decoupling capacitor in the chip capacitor, where the first capacitor C1 is provided to store energy for the input power supply and denoise the bypass high-frequency noise signal.

Figure 7:
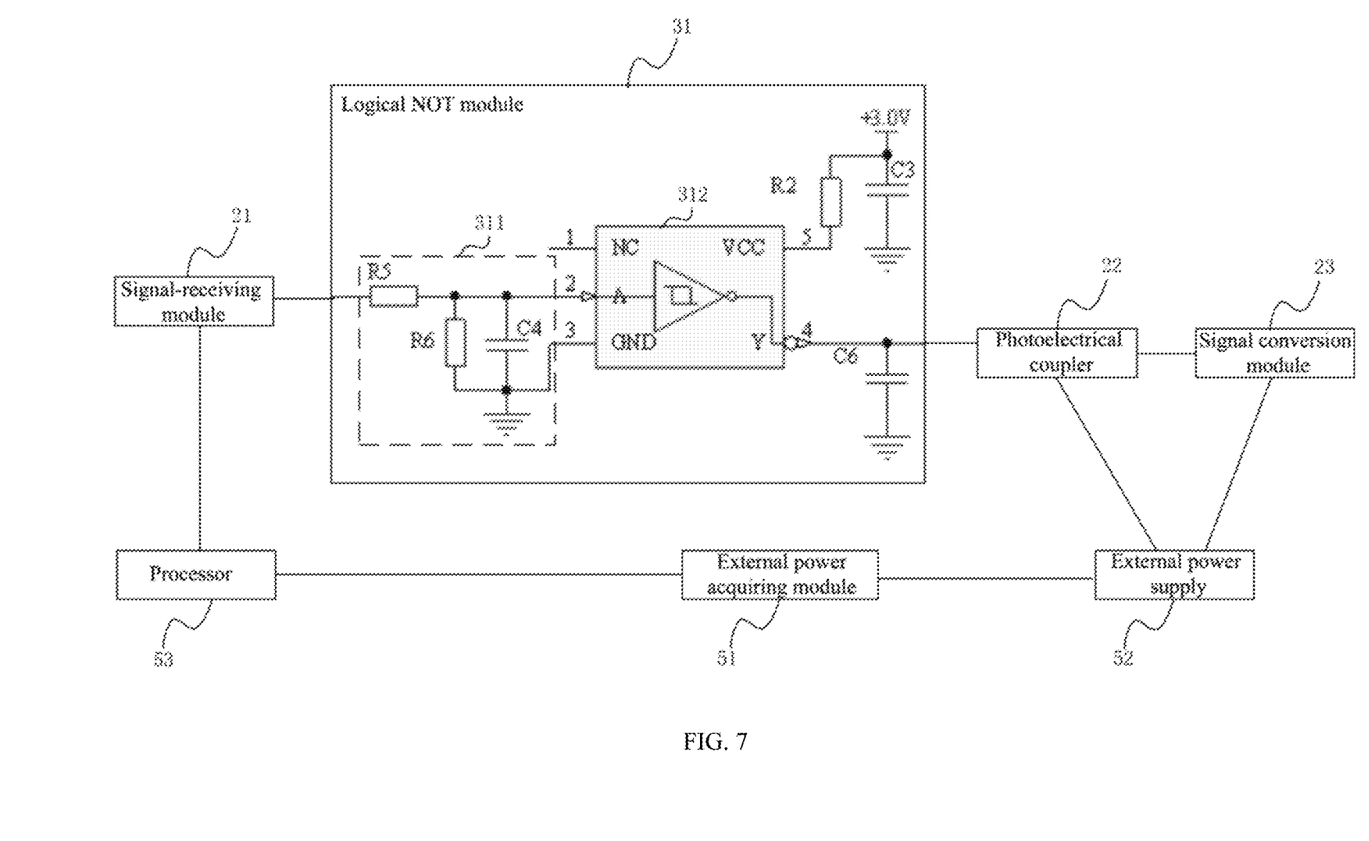
FIG. 7 is a schematic structural diagram of a pulse signal output circuit shown according to a fifth illustrative embodiment of the present application.

FIG. 7 is a schematic structural diagram of a pulse signal output circuit shown according to a fifth illustrative embodiment of the present application.

As shown in FIG. 7, in the pulse signal output circuit according to the present application, the logical NOT module 31 includes: a first current-limiting sub-module 311 and a logical NOT circuit 312.

The first current-limiting sub-module 311 is connected between the signal-receiving module 21 and the logical NOT circuit 312. The first current-limiting sub-module 311 can perform current-limiting on the source pulse signal sent by the signal-receiving module 21 to obtain a current-limiting signal.

The first current-limiting sub-module 311 sends the current-limiting signal to the logical NOT circuit 312, and the logical NOT circuit 312 performs reverse processing on the current-limiting signal to obtain the first sub-signal.

The logical NOT circuit 312 is connected between the first current-limiting sub-module 311 and the photoelectrical coupler 22, where the logical NOT circuit 312 can send the first sub-signal to the photoelectrical coupler 22, to transmit the pulse signal through the photoelectrical coupler 22.

Please continue to refer to FIG. 7, the first current-limiting sub-module 311 includes: a first resistor R5, a second resistor R6, and a second capacitor C4.

Specifically, the first resistor R5 is connected between the signal-receiving module 21 and the logical NOT circuit 312, and the second resistor R6 is connected between an input pin (pin 2) of the logical NOT circuit 312 and the ground. The R5 and R6 form a voltage-dividing circuit, thereby reducing the current of the electrical signal that is input to the logical NOT circuit 312, ensuring the stability of the input signal of the logical NOT circuit 312.

Further, the second capacitor C4 is connected between the input pin of the logical NOT circuit and the ground, where C4 and R6 are connected in parallel, which can achieve the function of filtering and further ensure the stability of the input signal of the logical NOT circuit 312.

In practical application, the logical NOT module 31 further includes: a third resistor R2, a third capacitor C3, and a fourth capacitor C6.

The third resistor R2 is provided between a power pin (pin 5) of the logical NOT circuit 312 and a first power supply. The first power supply may output a voltage of 3V, for example. R2 can perform limiting for the voltage that is input to the logical NOT circuit 312.

The third capacitor C3 is provided between the first power supply and the ground. The third capacitor C3 may be a chip capacitor, specifically a decoupling capacitor in the chip capacitor, where the third capacitor C3 is provided to store energy for the input power supply and denoise the bypass high-frequency noise signal.

The fourth capacitor C6 is provided between an output pin (pin 4) of the logical NOT circuit 312 and the ground. The fourth capacitor C6 may be a chip capacitor, specifically, it may be a decoupling capacitor in the chip capacitor, where the fourth capacitor C6 is provided to denoise the bypass high-frequency noise signal, so that the noise interference of the signal input from the logical NOT circuit 312 to the photoelectrical coupler 22 is less.

Figure 8:
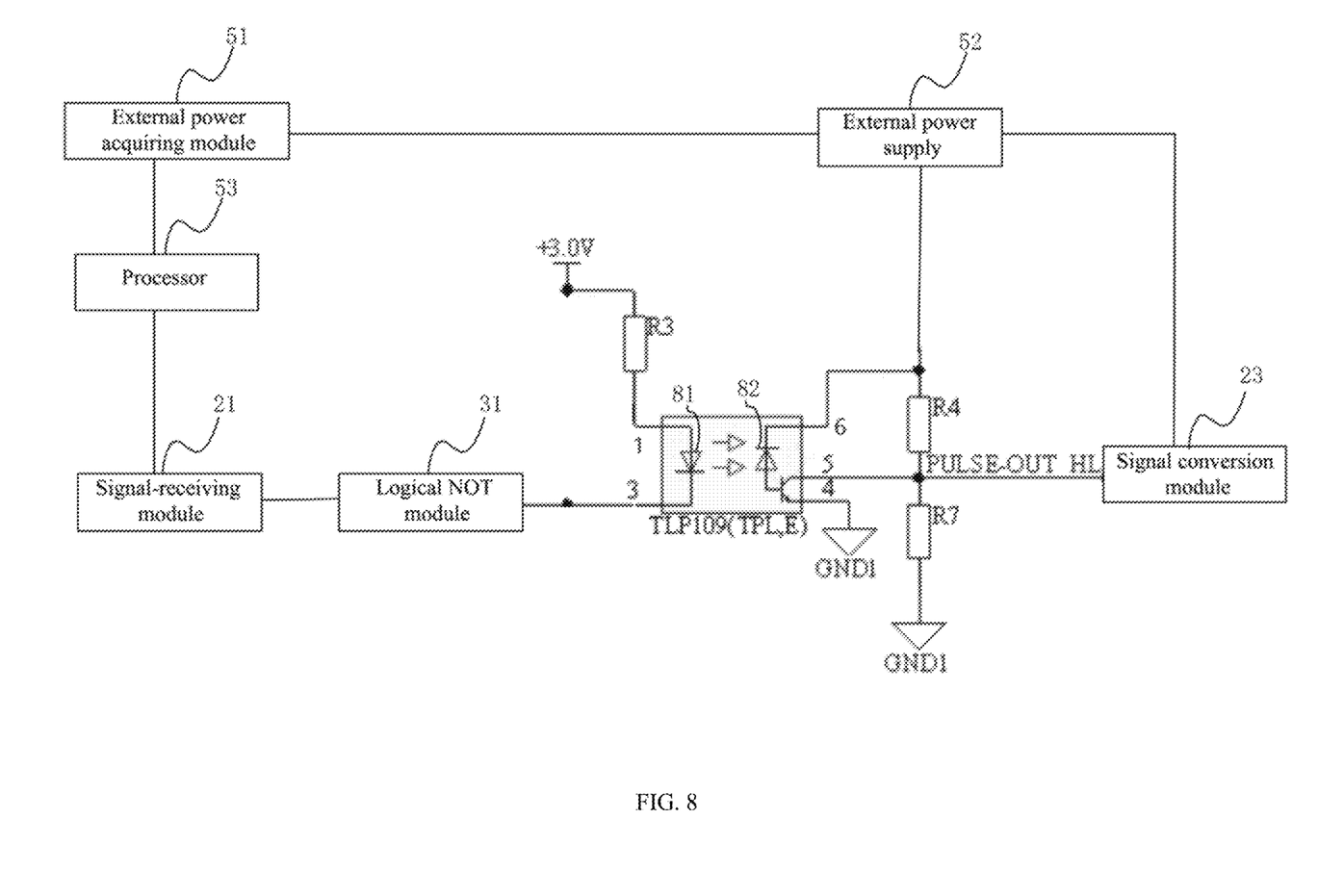
FIG. 8 is a schematic structural diagram of a pulse signal output circuit shown according to a sixth illustrative embodiment of the present application.

FIG. 8 is a schematic structural diagram of a pulse signal output circuit shown according to a sixth illustrative embodiment of the present application.

As shown in FIG. 8, in the pulse signal output circuit according to the present application, the circuit further includes a first current-limiting resistor R3; where the photoelectrical coupler includes a light-emitting component 81 and a light-receiving component 82.

Optionally, the model of the photoelectrical coupler may be TLP109, for example.

The first current-limiting resistor R3 is connected between a first end of the light-emitting component 81 and the first power supply. The first power supply may be, for example, 3V power supply, and the first power supply can also supply power to the logical NOT module 31.

The logical NOT module 31 is connected to a second end of the light-emitting component 81. The logical NOT module 31 can send the first sub-signal to the light-emitting component 81 to enable the light-emitting component 81 to emit light. The light-emitting component 81 may be, for example, a light-emitting diode.

A first end of the light-receiving component 82 is connected to the external power supply 52, the external power supply 52 can provide electrical energy for the light-receiving component 82, and the light-receiving component 82 can sense the light emitted by the light-emitting component 81 and generate an electrical signal.

Specifically, the light-receiving component 82 has its second end connected to the signal conversion module 23 and sends the electrical signal to the signal conversion module 23.

In this implementation, the electrical signal is transmitted through the light-emitting component and the light-receiving component in the photoelectrical coupler, so that the electrical isolation between the internal processing system of the flowmeter and the external interface circuit can be realized, thereby improving the performance to resist external interference for the internal processing system of the flowmeter.

Please continue to refer to FIG. 8, the pulse signal output circuit provided in the present application further includes: a fourth resistor R4 and a fifth resistor R7.

Further, a first end of the fourth resistor R4 is connected to the external power supply 52, a second end of the fourth resistor R4 is connected to a first end of the fifth resistor R7, the second end of the light receiving component 82, and the signal conversion module 23, respectively, where a second end of the fifth resistor R7 is connected to the ground.

In practical application, R4 and R7 are current-limiting voltage-dividing resistors, and a voltage-dividing signal (PULSE-OUT HL) is the input signal of the signal conversion module 23.

Figure 9:
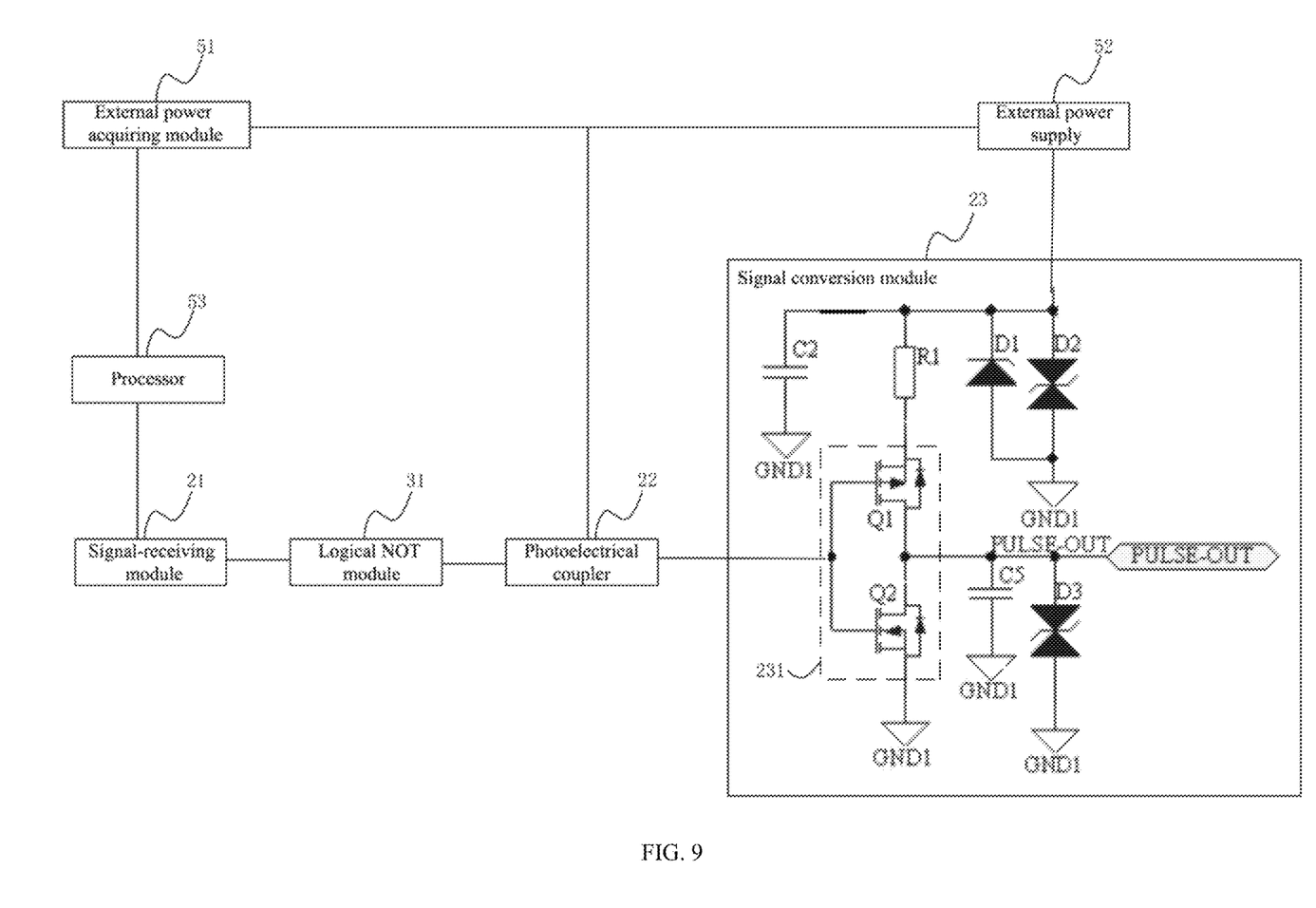
FIG. 9 is a schematic structural diagram of a pulse signal output circuit shown according to a seventh illustrative embodiment of the present application.

FIG. 9 is a schematic structural diagram of a pulse signal output circuit shown according to a seventh illustrative embodiment of the present application.

As shown in FIG. 9, in the pulse signal output circuit according to the present application, the signal conversion module 23 includes a conversion output circuit 231; where the conversion output circuit 231 is connected to the photoelectrical coupler 22. The conversion output circuit 231 receives the electrical signal output by the photoelectrical coupler 22.

Specifically, the second end of the light-receiving component 82 in the photoelectrical coupler 22 can be connected to the conversion output circuit 231, and then the electrical signal is sent to the conversion output circuit 231 through the light-receiving component 82.

Further, the conversion output circuit 231 performs conversion processing on the received electrical signal to obtain and output the output pulse signal corresponding to the source pulse signal.

In practical application, the conversion output circuit 231 can include: a P-type field-effect transistor Q1 and an N-type field-effect transistor Q2.

The photoelectrical coupler 22 is connected to a gate of the P-type field-effect transistor Q1 and a gate of the N-type field-effect transistor Q2, respectively. For example, the second end of the light-receiving component 82 in the photoelectrical coupler 22 is connected to the gate of the P-type field-effect transistor Q1 and the gate of the N-type field-effect transistor Q2, thereby the electrical signal is sent to the conversion output circuit 231.

A drain of the P-type field-effect transistor Q1 is connected to a drain of the N-type field-effect transistor Q2, and the output pulse signal (PULSE-OUT) is sent outwards from a connection of the drains.

When a gate level of a common end of the two field-effect transistors is high level, the connection of the drains is at a low level; when the gate level of the two field-effect transistors is low level, a high level consistent with a voltage supplied by the external power supply is output at the connection of the drains.

In an optional implementation, the conversion output circuit 231 includes: a P-type triode and an N-type triode; where the photoelectrical coupler is connected to a base of the P-type triode and a base of the N-type triode, respectively; a collector of the P-type triode is connected to a collector of the N-type triode, and the output pulse signal is sent outwards from the connection of the collectors.

Please continue to refer to FIG. 9, the signal conversion module includes a fifth capacitor C5; the connection of the drain of the P-type field-effect transistor and the drain of the N-type field-effect transistor is grounded through the fifth capacitor C5.

If the conversion output circuit 231 includes a P-type triode and an N-type triode, the connection of the collector of the P-type triode and the collector of the N-type triode is grounded through the fifth capacitor C5.

The fifth capacitor C5 may be a chip capacitor, specifically, it may be a decoupling capacitor in the chip capacitor, where the fifth capacitor C5 is provided to denoise the bypass high-frequency noise signal, so that the noise interference of the output pulse signal finally output is less.

Optionally, the signal conversion module 23 further includes: a second current-limiting resistor R1 and a sixth capacitor C2;

a source of the P-type field-effect transistor Q1 is connected to the external power supply 52 through the second current-limiting resistor R1. R1 can reduce the current in the conversion output circuit 231.

The sixth capacitor C2 is connected between the external power supply 52 and the ground. The sixth capacitor C2 may be a chip capacitor, specifically a decoupling capacitor in the chip capacitor, where the sixth capacitor C2 is provided to store energy for the input power supply and denoise the bypass high-frequency noise signal.

Optionally, the signal conversion module 23 further includes a first bidirectional transient suppression diode D2.

The first bidirectional transient suppression diode D2 is connected between the external power supply 52 and the ground. When the voltage input by the external power is too large, D2 can play a function of clamping the voltage, thereby protecting all components on the left side of the circuit from damage due to a transient high voltage.

Optionally, the signal conversion module 23 further includes a stabilivolt tube D1. The stabilivolt tube D1 is connected between the external power supply 52 and the ground. When D2 is clamped at a high voltage, the stabilivolt tube D1 can further stabilize an external input voltage, so that an external abnormal input voltage can be stabilized at a corresponding voltage value.

In an optional implementation, the signal conversion module 23 further includes a second bidirectional transient suppression diode D3, which is connected between the connection of the drain of the P-type field-effect transistor and the drain of the N-type field-effect transistor and the ground. D3 plays a function of clamping the voltage when the external pulse signal port has an interference-excessive signal or a wiring error, so as to protect all components on the left side of the circuit from being damaged due to the external transient high voltage.

Figure 10:
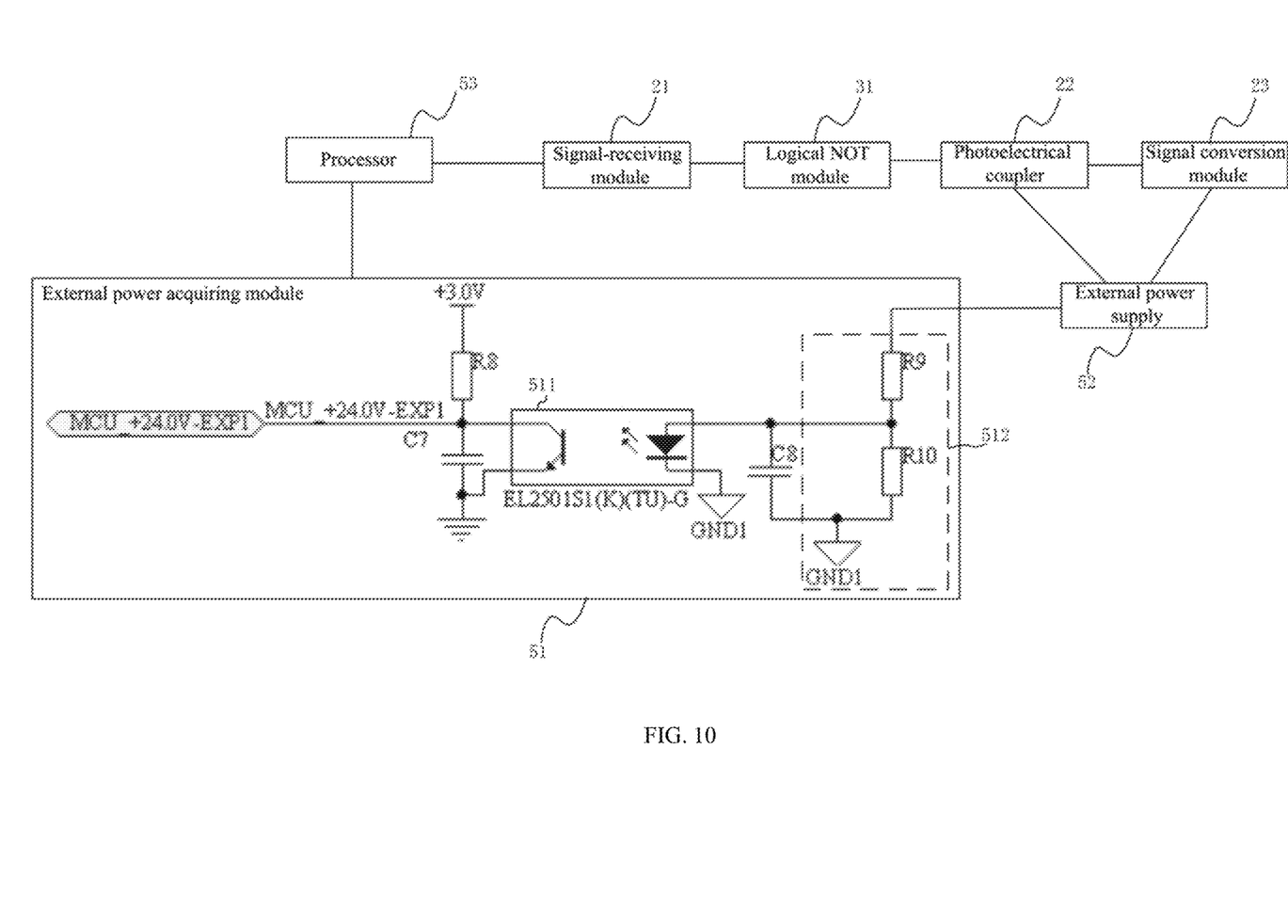
FIG. 10 is a schematic structural diagram of a pulse signal output circuit shown according to an eighth illustrative embodiment of the present application.

FIG. 10 is a schematic structural diagram of a pulse signal output circuit shown according to an eighth illustrative embodiment of the present application.

As shown in FIG. 10, in the pulse signal output circuit according to the present application, the external power acquiring module 51 includes an external acquiring photoelectrical coupler 511 and a second voltage-dividing sub-module 512;

where the external power supply 52 is connected to the second voltage-dividing sub-module 512. The external power supply 52 can send a power signal to the second voltage-dividing sub-module 512, and the second voltage-dividing sub-module 512 performs voltage-dividing processing on the received power signal to obtain a voltage-dividing signal.

The second voltage-dividing sub-module 512 can include resistors R9 and R10 therein, and the external power supply 52 is grounded through the resistors R9 and R10. The electrical signal obtained by voltage division on the resistor R10 is a voltage signal, which is input to the external acquiring photoelectrical coupler 511 to provide a conducting condition for the external acquiring photoelectrical coupler 511.

The second voltage-dividing sub-module 512 is connected to the external acquiring photoelectrical coupler 511, and the second voltage-dividing sub-module 512 can send a voltage-dividing signal to the external acquiring photoelectrical coupler 511.

The external acquiring photoelectrical coupler 511 is connected to the processor 53, and the external acquiring photoelectrical coupler 511 processes the voltage signal to generate an optical signal, and sends the first reference signal or the second reference signal to the processor 53 according to the optical signal.

The external acquiring photoelectrical coupler 511 is configured to transmit the signal of the presence or absence of the power signal provided by the external power supply 52, and the external acquiring photoelectrical coupler 511 can play a role of insulative isolation, to enable the external power supply 52 to be electrically isolated from the flowmeter, thereby improving the performance to resist external interference for the processor.

In an optional implementation, the external power acquiring module 51 further includes a pull-up resistor R8;

the output terminal of the external acquiring photoelectrical coupler 511 is connected to the first power supply through the pull-up resistor R8. The first power supply may be, for example, a 3V power supply.

When the external power supply 52 does not supply power, the external acquiring photoelectrical coupler 511 sends a voltage signal corresponding to the first power supply to the processor 53.

In this implementation, when the external power supply 52 does not supply power, the external acquiring photoelectrical coupler 511 can continuously send a 3V voltage signal to the processor 53. When the external power supply 52 supplies power, the external acquiring photoelectrical coupler 511 can send an electrical signal generated according to a current-dividing signal to the processor 53. The processor can determine, according to the received signal, whether the external power supply 52 supplies power.

Optionally, the external power acquiring module 51 further includes: a seventh capacitor C7 and an eighth capacitor C8;

where the seventh capacitor C7 is connected between the pull-up resistor R8 and the ground. The seventh capacitor C7 may be a chip capacitor, specifically a decoupling capacitor in the chip capacitor, where the seventh capacitor C7 is provided to denoise the bypass high-frequency noise signal, so that the noise interference of the signal input to the processor is less.

The eighth capacitor C8 is connected between the external acquiring photoelectrical coupler 511 and the ground. The eighth capacitor C8 may be a chip capacitor, specifically a decoupling capacitor in the chip capacitor, where the eighth capacitor C8 is provided to store energy for the input power supply and denoise the bypass high-frequency noise signal.

The present application further provides a flowmeter, which includes any one of the pulse signal output circuits described above.

In the description of the present application, it should be understood that the terms "center", "longitudinal", "transverse", "length", "width", "thickness", "up", "down", "front", "back", "left", "right", "vertical", "horizontal", "top", "bottom", "internal", "external", "clockwise", "counter-clockwise", "axial", "radial", "circumferential" and other indicated orientations or positional relationships are based on the orientations or positional relationships shown in the drawings, which are only for the sake of the convenience of describing the present application and simplifying the description, rather than indicating or implying the referred device or elements must have a certain orientation, be constructed and operated in a certain orientation, and thus should not be construed as limiting on the present application.

It should be noted that in the description of the present application, the terms "first" and "second" are only used for the convenience of describing different parts, and should not be understood as indicating or implying a sequence relationship, relative importance, or implicitly indicating the number of indicated technical features. Thus, the feature defined with "first" and "second" may explicitly or implicitly include at least one said feature.

In the present application, unless otherwise clearly specified, the terms "install", "connect with", "connect to", "fix" and other terms should be understood in a broad sense, for example, it may indicate a fixed connection or a detachable connection, or an integral formation, it may indicate a mechanical connection, an electrical connection or a mutual communication, a direct connection, or an indirect connection through an intermediate medium, an internal communication of two components or the interaction relationship between two components, unless otherwise explicitly defined. For those of ordinary skill in the art, the specific meanings of the above terms in the present application can be understood according to specific situations.

Finally, it should be noted that: the above embodiments are only used to illustrate the technical solutions of the present application, and are not intended to limit the present application; although the present application has been described in detail with reference to the foregoing embodiments, those of ordinary skill in the art should understand that: they still can modify the technical solutions described in the foregoing embodiments, or equivalently replace some or all of the technical features thereof; and these modifications or replacements do not make the essence of the corresponding technical solutions depart from the scope of the technical solutions of the embodiments of the present application.

The invention claimed is:

1. A pulse signal output circuit, comprising: a signal-receiving circuit, a photoelectrical coupler, and a signal conversion circuit;

wherein the signal-receiving circuit is connected to the photoelectrical coupler, and the photoelectrical coupler is connected to the signal conversion circuit;

the signal-receiving circuit is configured to receive a source pulse signal acquired by a flowmeter and send the source pulse signal to the photoelectrical coupler;

the photoelectrical coupler is configured to perform electrical-optical-electrical conversion processing on the received source pulse signal to obtain an electrical signal, and send the electrical signal to the signal conversion circuit; and the signal conversion circuit is configured to perform conversion processing on the received electrical signal, to obtain and output an output pulse signal corresponding to the source pulse signal;

wherein the pulse signal output circuit further comprises a logical NOT circuit;

the signal-receiving circuit is connected to the logical NOT circuit, and the logical NOT circuit is connected to the photoelectrical coupler; and the signal-receiving circuit sends the source pulse signal to the logical NOT circuit, and the logical NOT circuit processes the source pulse signal to obtain and send a first sub-signal to the photoelectrical coupler;

wherein the logical NOT circuit comprises a first current-limiting sub-circuit and a logical NOT sub-circuit;

the first current-limiting sub-circuit is connected between the signal-receiving circuit and the logical NOT sub-circuit; the logical NOT sub-circuit is connected between the first current-limiting sub-circuit and the photoelectrical coupler;

the first current-limiting sub-circuit receives the source pulse signal sent by the signal-receiving circuit, and performs current-limiting on the source pulse signal to obtain a current-limiting signal;

the first current-limiting sub-circuit sends the current-limiting signal to the logical NOT sub-circuit; and the logical NOT sub-circuit performs reverse processing on the current-limiting signal to obtain and send the first sub-signal to the photoelectrical coupler;

wherein the logical NOT circuit further comprises: a third resistor, a third capacitor, and a fourth capacitor;

the third resistor is provided between a power pin of the logical NOT sub-circuit and a first power supply;

the third capacitor is provided between the first power supply and ground; and the fourth capacitor is provided between an output pin of the logical NOT sub-circuit and the ground.

2. The pulse signal output circuit according to claim 1, further comprising: an external power acquiring circuit;

wherein the external power acquiring circuit is connected between an external power supply and a processor;

when the external power supply supplies power, the external power acquiring circuit sends a first reference signal to the processor;

when the external power supply does not supply power, the external power acquiring circuit sends a second reference signal to the processor;

wherein the external power supply supplies power to the photoelectrical coupler and the signal conversion circuit.

3. The pulse signal output circuit according to claim 2, wherein the processor is connected to the signal-receiving circuit;

if the first reference signal is received by the processor, the processor sends a first control signal to the signal-receiving circuit; and when the first control signal is received by the signal-receiving circuit, the signal-receiving circuit receives the source pulse signal acquired by the flowmeter;

if the second reference signal is received by the processor, the processor sends a second control signal to the signal-receiving circuit; and when the second control signal is received by the signal-receiving circuit, the signal-receiving circuit continuously outputs a preset level.

4. The pulse signal output circuit according to claim 2, wherein the external power acquiring circuit comprises an external acquiring photoelectrical coupler and a second voltage-dividing sub-circuit;

the external power supply is connected to the second voltage-dividing sub-circuit, the second voltage-dividing sub-circuit is connected to the external acquiring photoelectrical coupler, and the external acquiring photoelectrical coupler is connected to the processor;

the external power supply sends a power signal to the second voltage-dividing sub-circuit;

the second voltage-dividing sub-circuit performs voltage-dividing processing on the power signal, to obtain and send a voltage-dividing signal to the external acquiring photoelectrical coupler; and the external acquiring photoelectrical coupler processes the received voltage-dividing signal to generate an optical signal, and then sends the first reference signal or the second reference signal to the processor according to the optical signal.

5. The pulse signal output circuit according to claim 4, wherein the external power acquiring circuit further comprises a pull-up resistor;

an output terminal of the external acquiring photoelectrical coupler is connected to a first power supply through the pull-up resistor; and when the external power supply does not supply power, the external acquiring photoelectrical coupler sends a voltage signal corresponding to the first power supply to the processor.

6. The pulse signal output circuit according to claim 5, wherein the external power acquiring circuit further comprises a seventh capacitor and an eighth capacitor;

the seventh capacitor is connected between the pull-up resistor and the ground; and the eighth capacitor is connected between the external acquiring photoelectrical coupler and the ground.

7. The pulse signal output circuit according to claim 1, wherein the signal-receiving circuit comprises a signal-receiving chip;

a first signal input pin of the signal-receiving chip is connected to an output terminal of an operating condition pulse of the flowmeter, and a second signal input pin of the signal-receiving chip is connected to an output terminal of a standard condition pulse of the flowmeter; and a setting pin of the signal-receiving chip is connected to a processor of the flowmeter for receiving a channel selection signal sent by the processor;

when the channel selection signal is a first channel signal, the first signal input pin of the signal-receiving chip is turned on, and the first signal input pin is used to receive the operating condition pulse;

when the channel selection signal is a second channel signal, the second signal input pin of the signal-receiving chip is turned on, and the second signal input pin is used to receive the standard condition pulse.

8. The pulse signal output circuit according to claim 1, wherein the first current-limiting sub-circuit comprises: a first resistor, a second resistor, and a second capacitor;

the first resistor is connected between the signal-receiving circuit and the logical NOT sub-circuit;

the second resistor is connected between an input pin of the logical NOT sub-circuit and the ground; and the second capacitor is connected between the input pin of the logical NOT sub-circuit and the ground.

9. The pulse signal output circuit according to claim 1, further comprising: a first current-limiting resistor; wherein the photoelectrical coupler comprises a light-emitting component and a light-receiving component;

the first current-limiting resistor is connected between a first end of the light emitting component and the first power supply;

the logical NOT circuit is connected to a second end of the light-emitting component; and a first end of the light-receiving component is connected to an external power supply, and a second end of the light-receiving component is connected to the signal conversion circuit.

10. The pulse signal output circuit according to claim 9, further comprising: a fourth resistor and a fifth resistor;

wherein a first end of the fourth resistor is connected to the external power supply, and a second end of the fourth resistor is connected to a first end of the fifth resistor, the second end of the light-receiving component and the signal conversion circuit, respectively; and a second end of the fifth resistor is connected to the ground.

11. The pulse signal output circuit according to claim 1, wherein the signal conversion circuit comprises: a conversion output circuit;

the conversion output circuit is connected to the photoelectrical coupler; and the conversion output circuit receives the electrical signal sent by the photoelectrical coupler and performs conversion processing on the electrical signal to obtain and output the output pulse signal corresponding to the source pulse signal.

12. The pulse signal output circuit according to claim 11, wherein the conversion output circuit comprises: a P-type field-effect transistor and an N-type field-effect transistor;
   the photoelectrical coupler is connected to a gate of the P-type field-effect transistor and a gate of the N-type field-effect transistor, respectively; and
   a drain of the P-type field-effect transistor is connected to a drain of the N-type field-effect transistor, and the output pulse signal is sent outward from a connection of the drains;
   or, the conversion output circuit comprises a P-type triode and an N-type triode;
   the photoelectrical coupler is connected to a base of the P-type triode and a base of the N-type triode, respectively; and
   a collector of the P-type triode is connected to a collector of the N-type triode, and the output pulse signal is sent outward from a connection of the collectors.

13. The pulse signal output circuit according to claim 12, wherein the signal conversion circuit comprises at least one of a fifth capacitor or a first capacitor;
   the connection of the drain of the P-type field-effect transistor and the drain of the N-type field-effect transistor is grounded through the fifth capacitor;
   or, the connection of the collector of the P-type triode and the collector of the N-type triode is grounded through the fifth capacitor;
   the first capacitor is connected between a power pin and a ground pin of a signal-receiving chip of the signal-receiving circuit.

14. The pulse signal output circuit according to claim 12, wherein the signal conversion circuit comprises: a second current-limiting resistor and a sixth capacitor;
   a source of the P-type field-effect transistor is connected to an external power supply through the second current-limiting resistor; and
   the sixth capacitor is connected between the external power supply and the ground.

15. The pulse signal output circuit according to claim 14, wherein the signal conversion circuit further comprises a first bidirectional transient suppression diode and a voltage-regulating diode;
   the first bidirectional transient suppression diode is connected between the external power supply and the ground; and
   the voltage-regulating diode is connected between the external power supply and the ground.

16. The pulse signal output circuit according to claim 12, wherein the signal conversion circuit further comprises a second bidirectional transient suppression diode; and
   the second bidirectional transient suppression diode is connected between the connection of the drain of the P-type field-effect transistor and the drain of the N-type field-effect transistor and the ground.

17. A flowmeter, comprising: the pulse signal output circuit according to claim 1.

* * * * *